Dec. 8, 1959   C. H. WIKLUND   2,915,840
AUTOMATIC ACTUATING MECHANISM FOR
PHOTOGRAPHIC SLIDES AND THE LIKE
Filed April 12, 1957   12 Sheets-Sheet 1
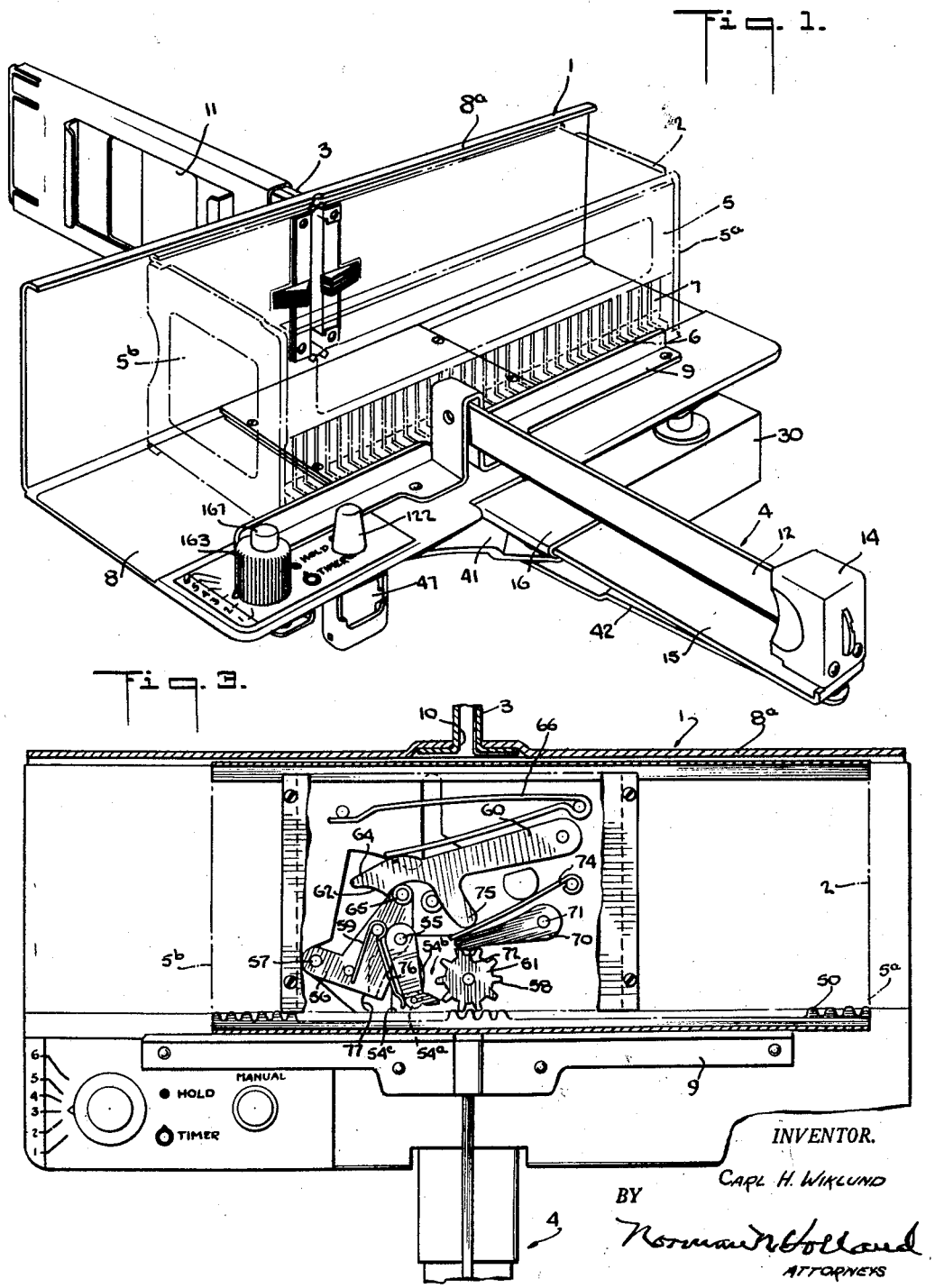
INVENTOR.
CARL H. WIKLUND
BY
Norman N. Holland
ATTORNEYS Dec. 8, 1959 C. H. WIKLUND 2,915,840
AUTOMATIC ACTUATING MECHANISM FOR
PHOTOGRAPHIC SLIDES AND THE LIKE
Filed April 12, 1957 12 Sheets-Sheet 2
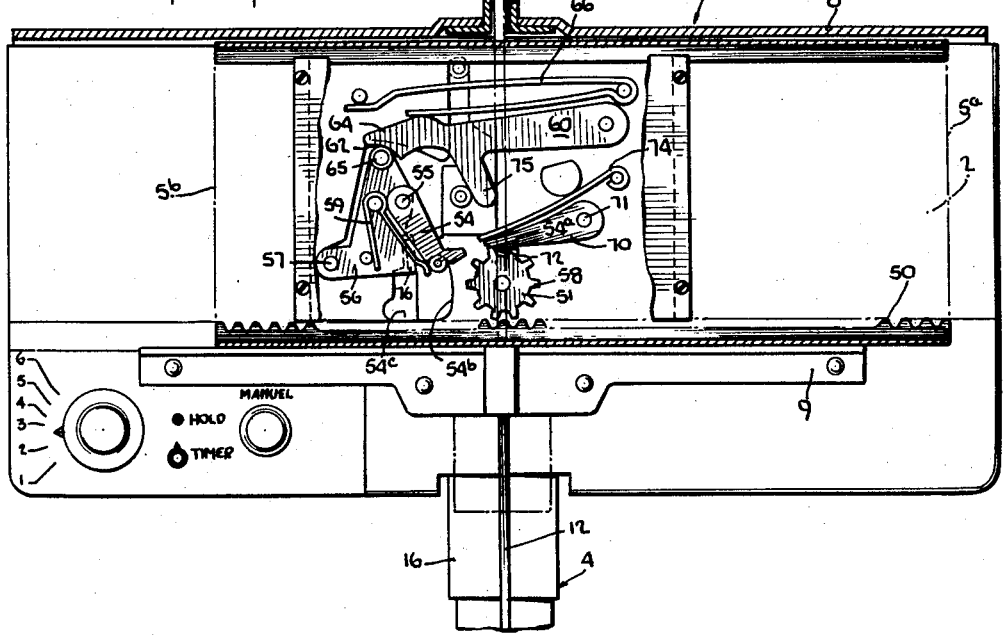
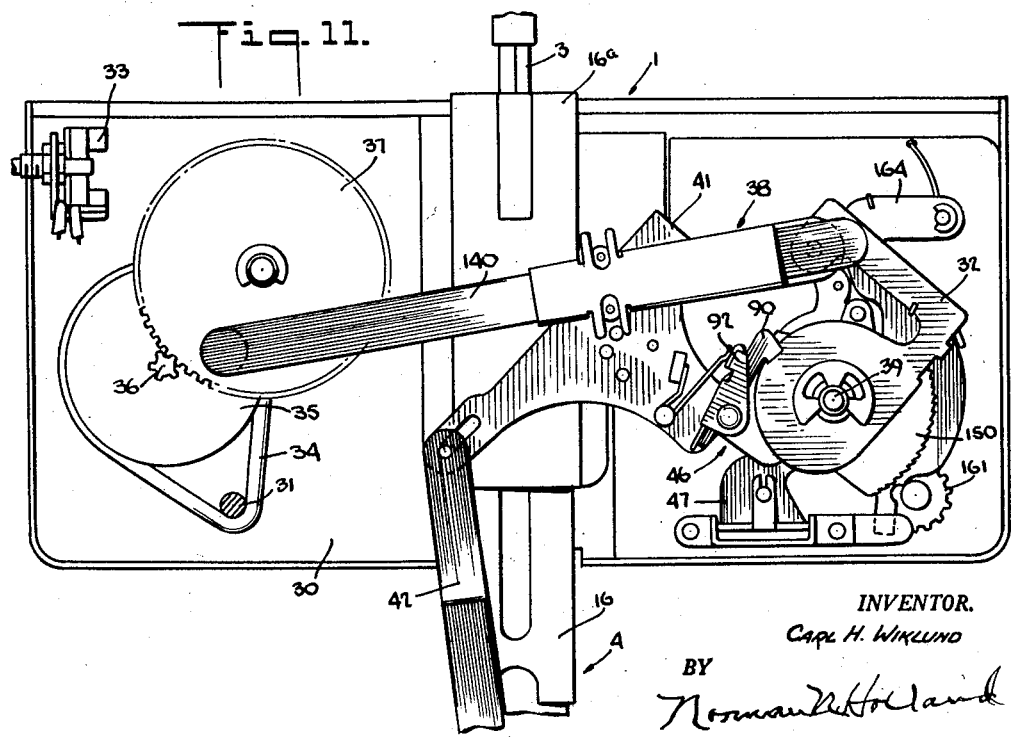
INVENTOR.
CARL H. WIKLUND
BY
ATTORNEY

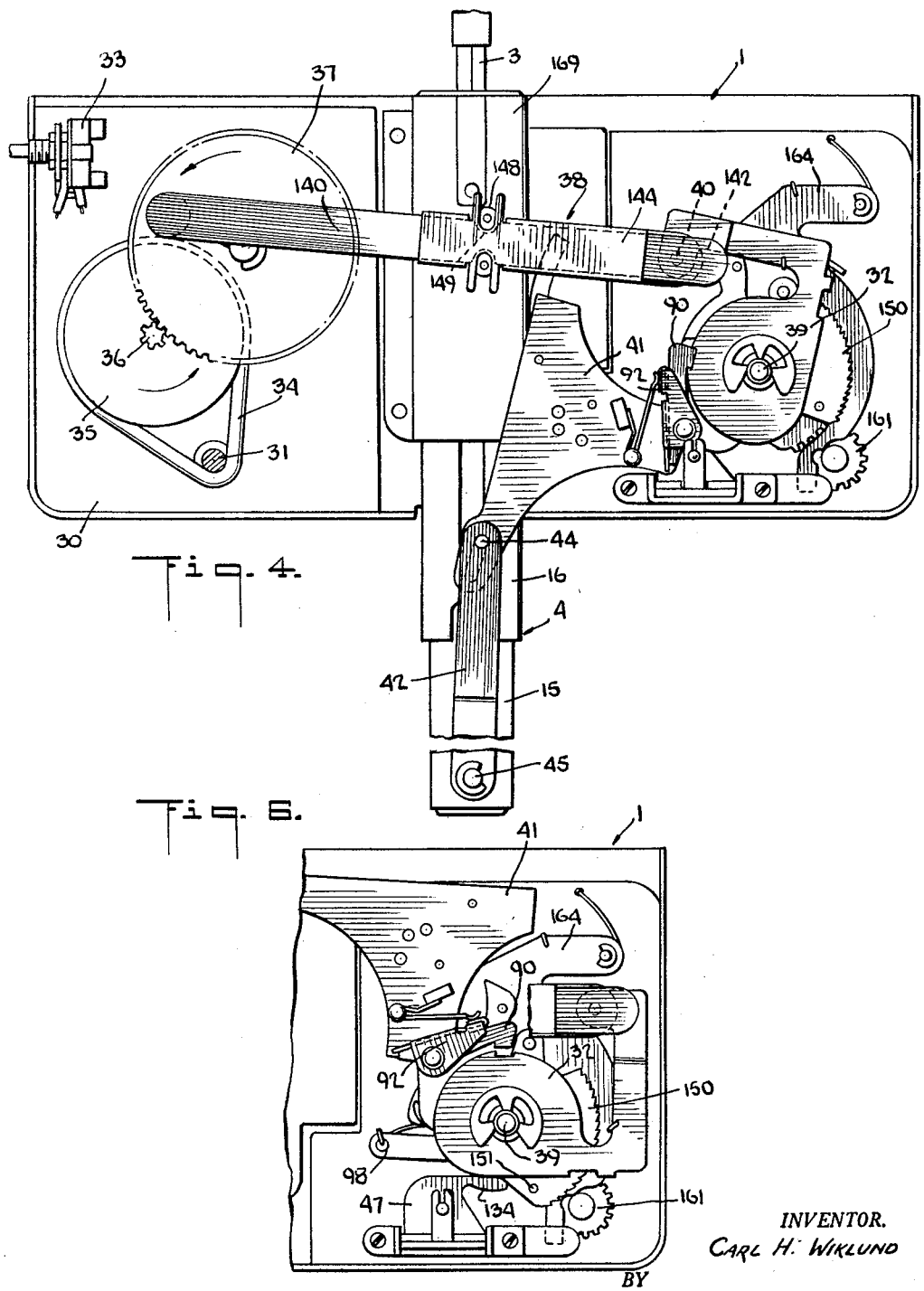

INVENTOR.
CARL H. WIKLUND

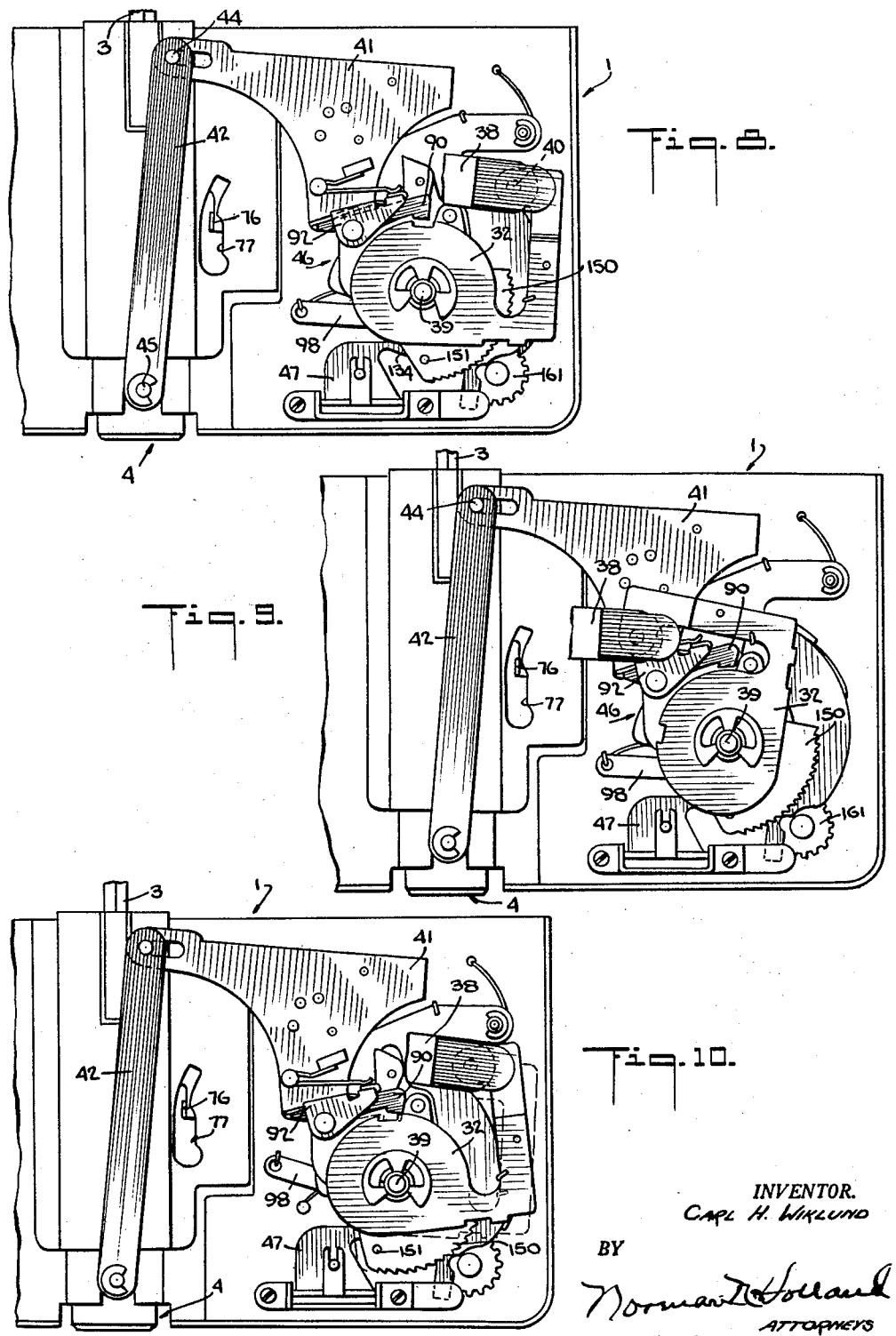

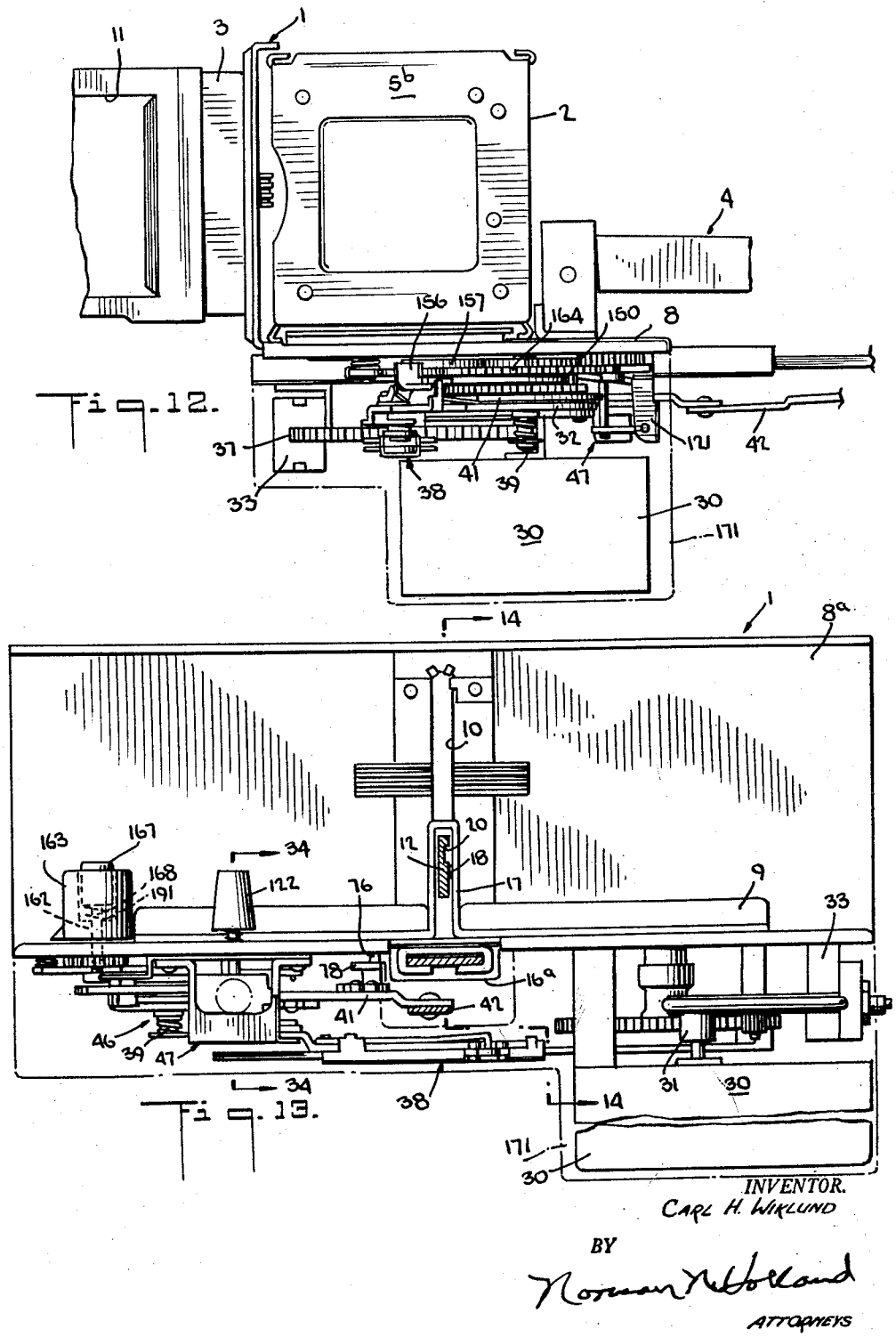

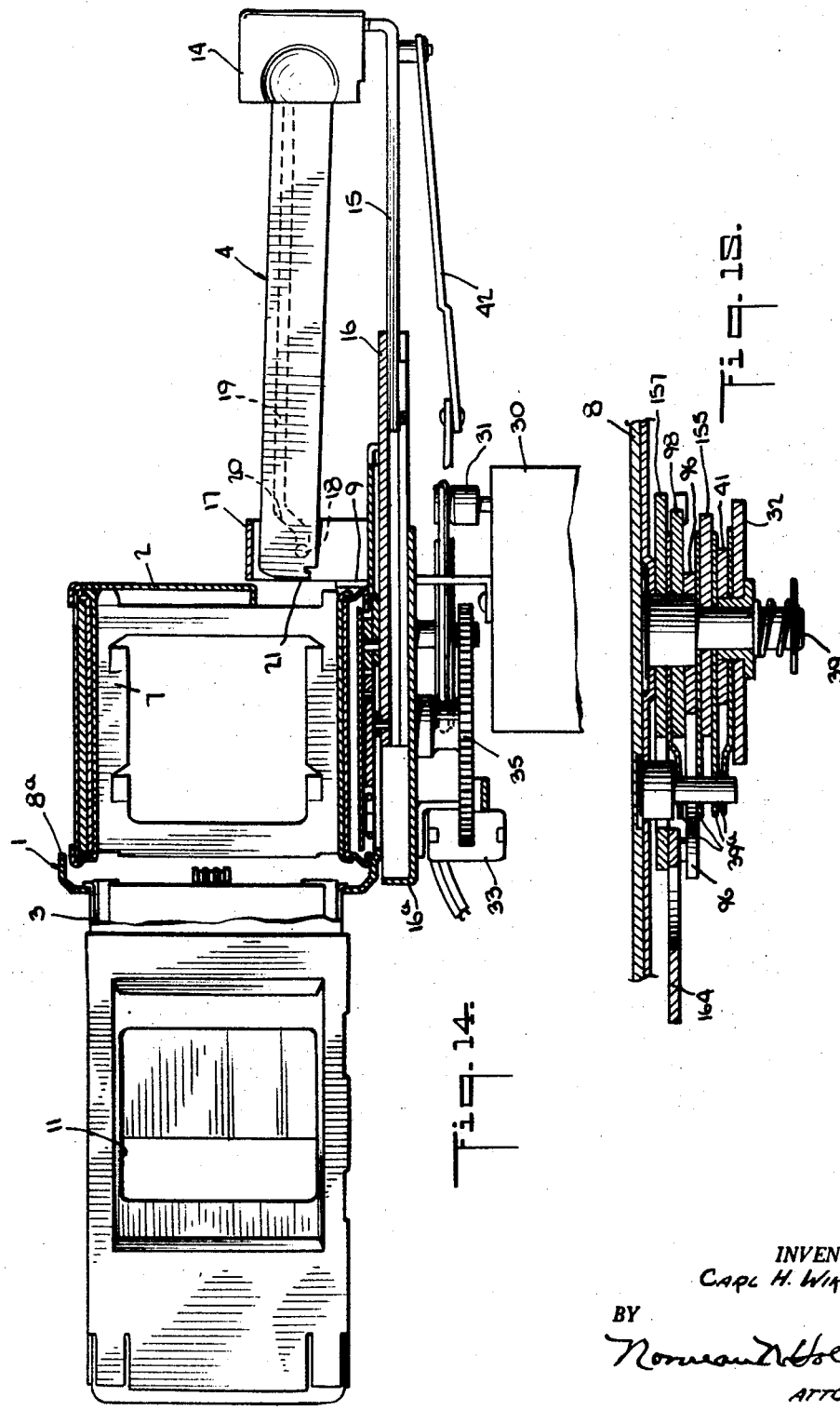

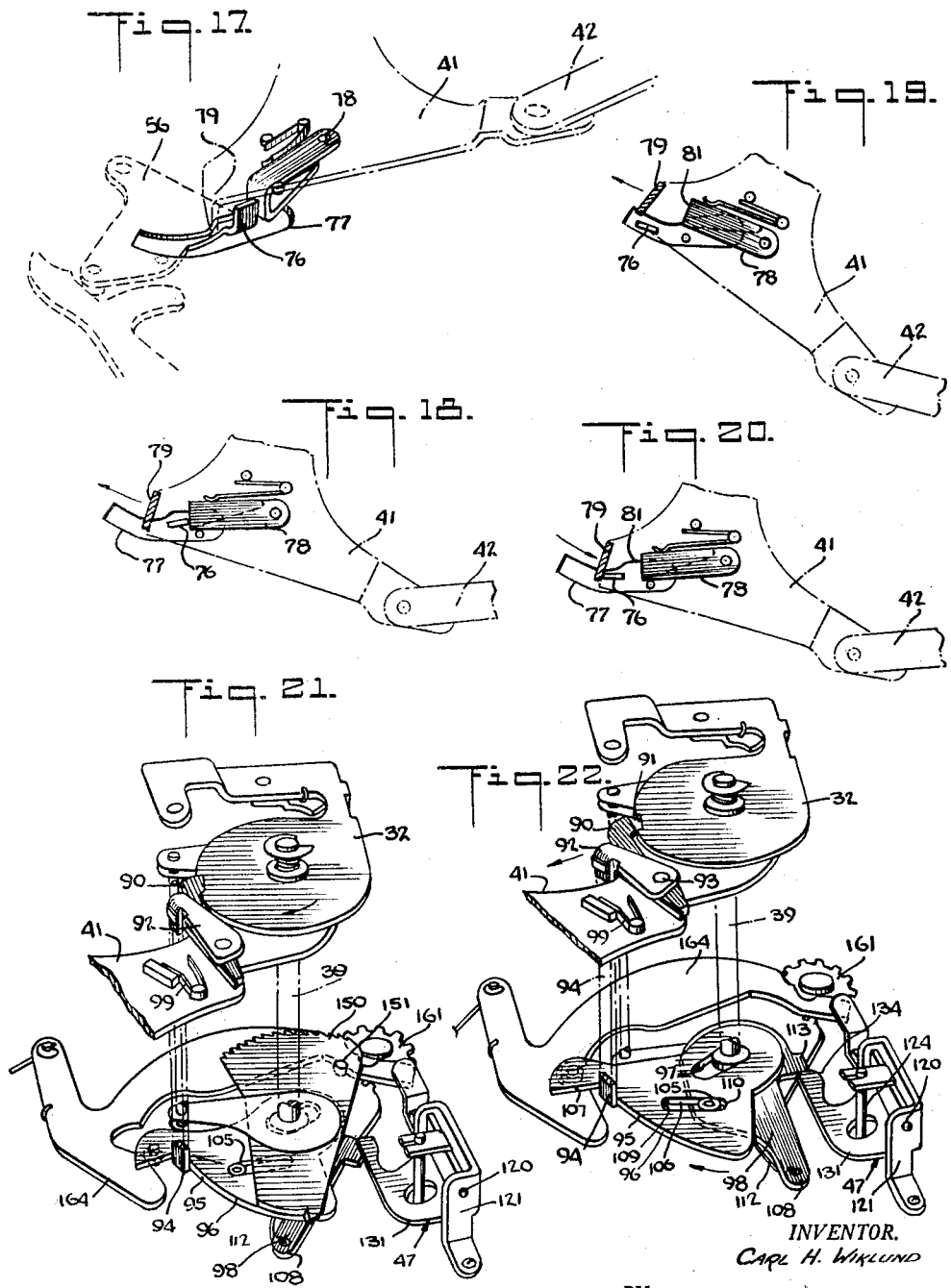

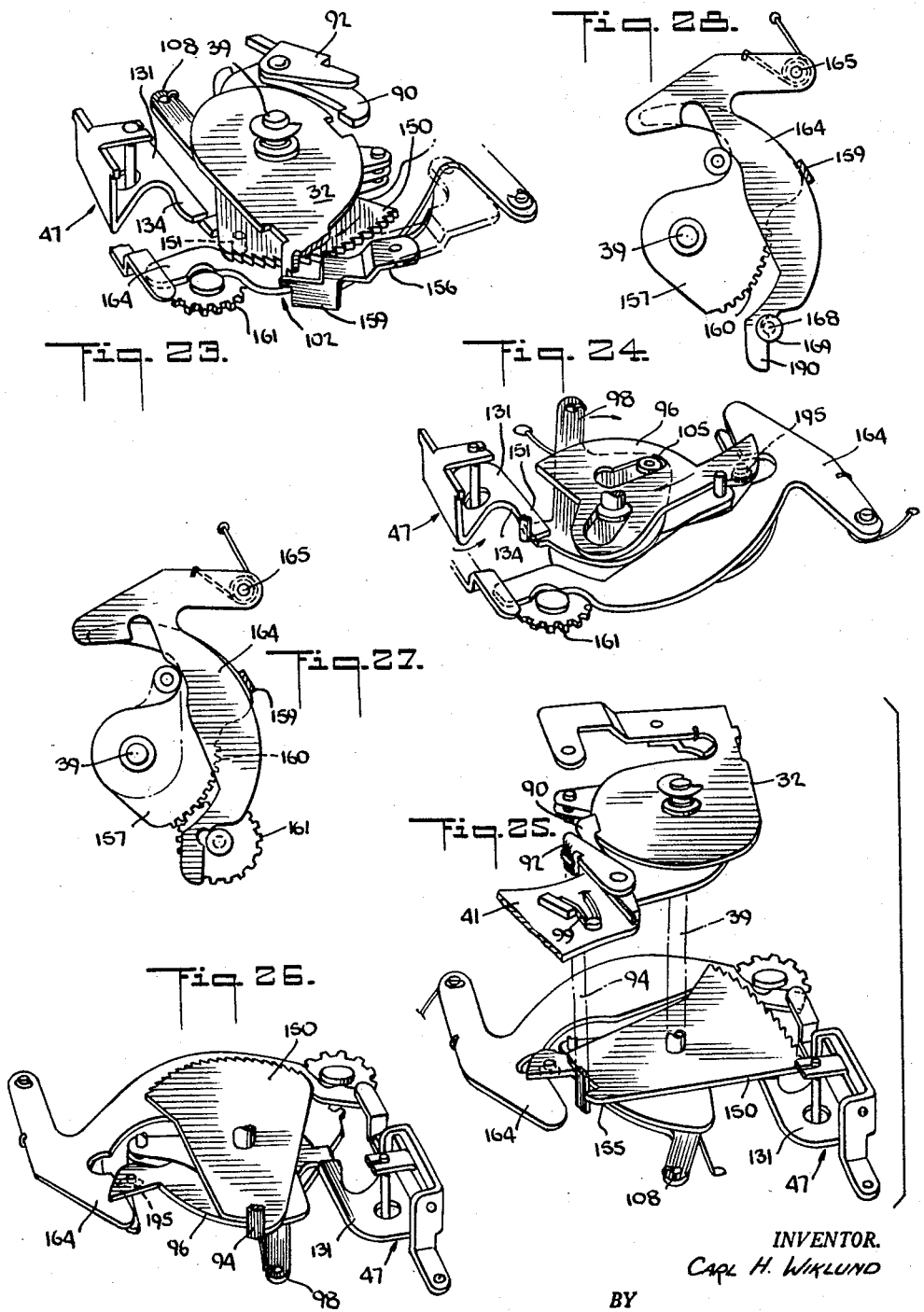

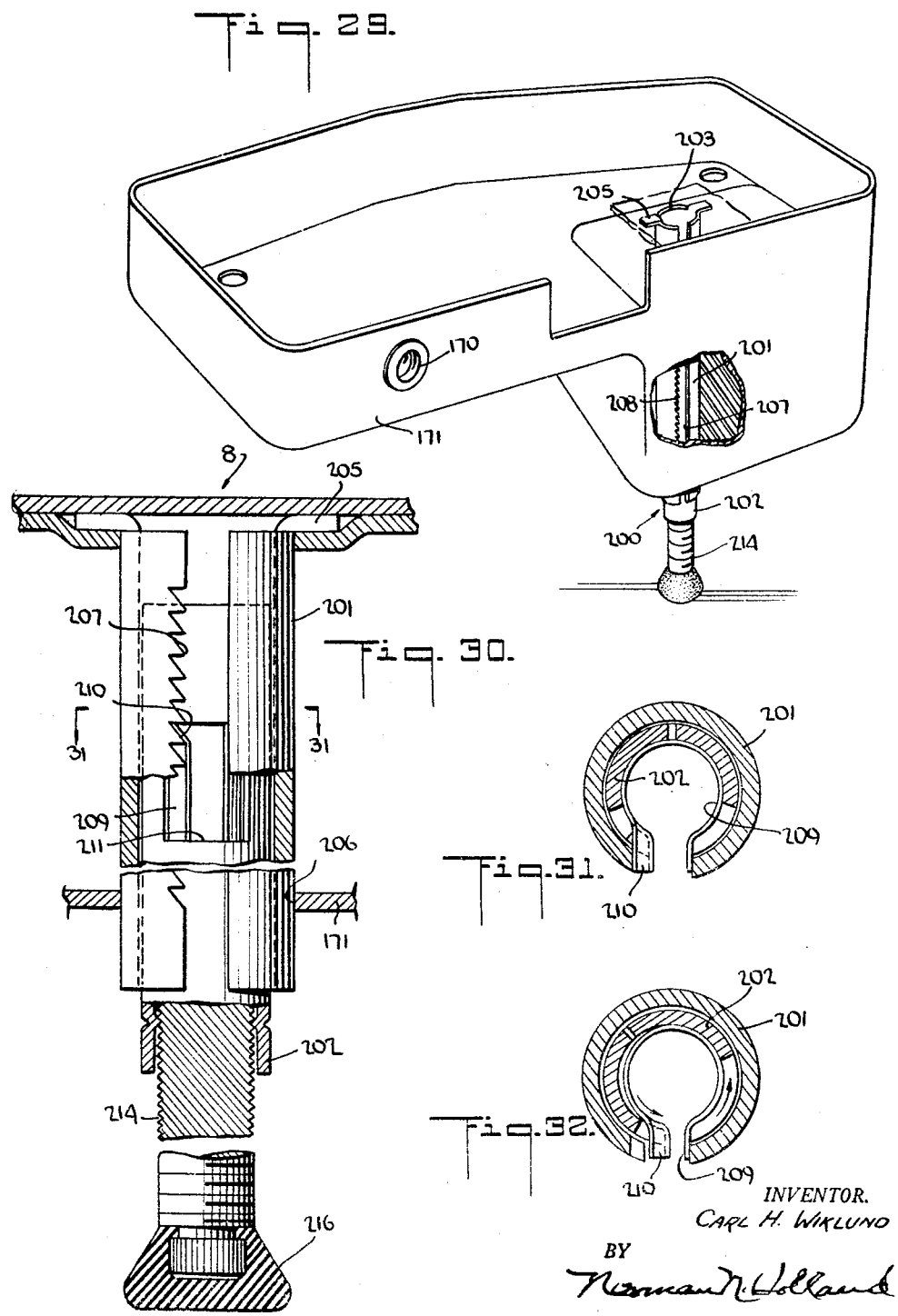

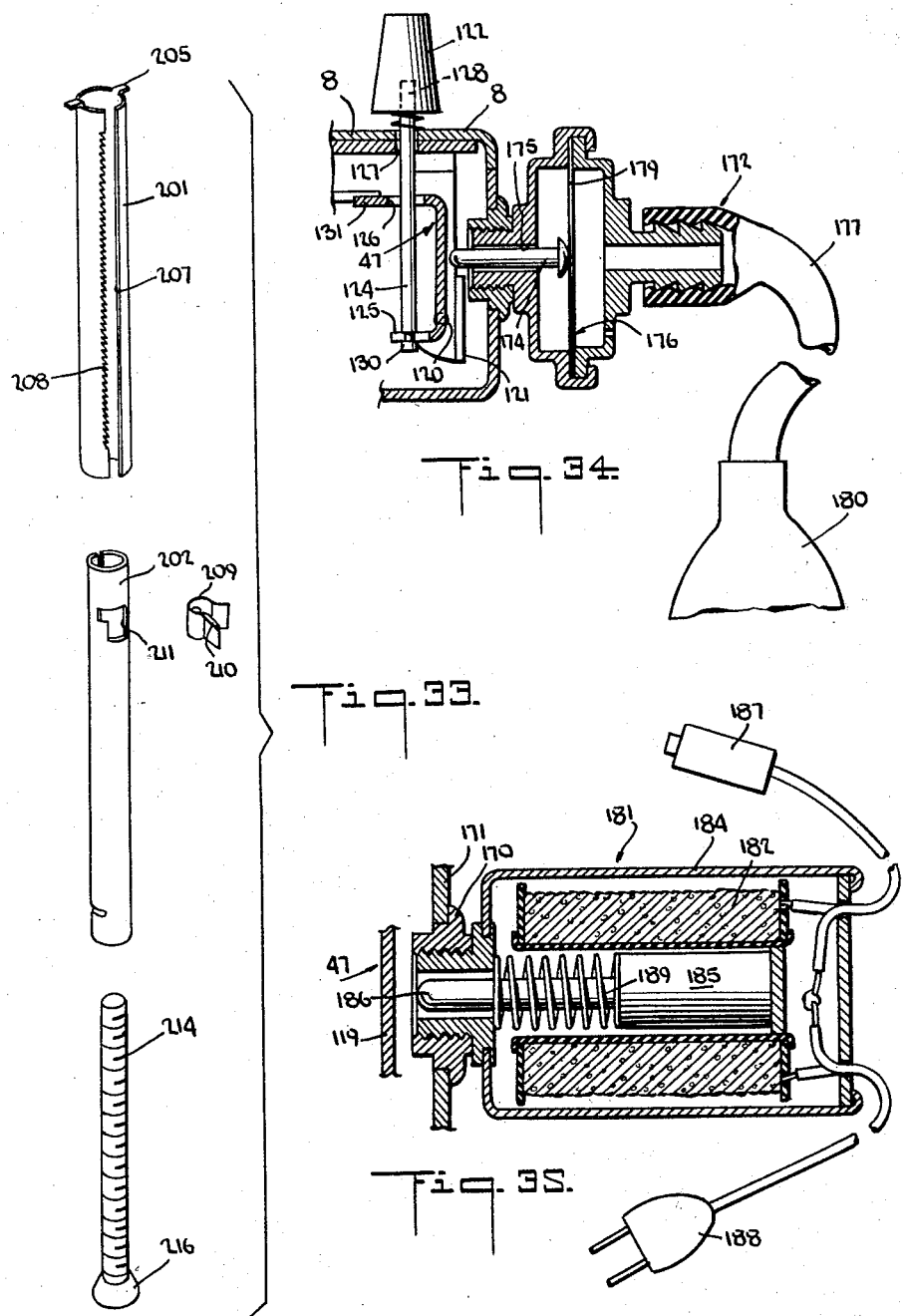

United States Patent Office 2,915,840
Patented Dec. 8, 1959

2,915,840

AUTOMATIC ACTUATING MECHANISM FOR PHOTOGRAPHIC SLIDES AND THE LIKE

Carl H. Wiklund, New Rochelle, N.Y., assignor to Airequipt Manufacturing Co., Inc., New Rochelle, N.Y., a corporation of New York Application April 12, 1957, Serial No. 652,610

9 Claims. (Cl. 40—79)

The present invention relates to slide exhibiting apparatus and more particularly to means for automatically changing the exhibited slides at predetermined and adjustable intervals. The means of the invention is adaptable for use with the slide changing means disclosed in my Patent No. 2,711,602, issued June 28, 1955, as well as other slide changers which use a reciprocating arm to move slides into and out of a viewing position and other similar devices.

Various types of automatic slide changing mechanisms are known in which the slides are moved into a viewing position at predetermined intervals by an automatic actuating device. These presently known changers are characterized by their relative complexity and by their lack of suitable adjusting means to vary the projection times of the individual slides within the desired ranges. In the present invention, a relatively compact and rugged slide changing mechanism is provided having an integral timer to control the projection time of the slides. The slide changing mechanism may be readily incorporated into existing slide changers or slide viewing devices.

Accordingly, an object of the present invention is to provide an improved automatic slide changing means.

Another object of the invention is to provide an automatic slide changing means having an improved interval control.

Another object of the invention is to provide an automatic slide changer having an easily adjustable slide viewing time interval control.

Another object of the invention is to provide an automatic slide changing mechanism of relatively rugged and compact construction which is capable of a wide range of viewing times.

Another object of the invention is to provide an automatic slide changer adapted for remote control.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 1 is a perspective view of a slide changer with the automatic slide changing means of the invention;

Figs. 2 and 3 are top views partially cut away showing the magazine indexing mechanism of the slide changing means in two positions;

Figs. 4–11 are bottom views partially cut away of the slide changing mechanism with the bottom cover removed showing the relationship of the parts of the slide changing mechanism at successive positions during a slide changing cycle;

Fig. 12 is a side elevational view partially cut away of the slide changing mechanism with the cover removed;

Fig. 13 is a front elevational view partially cut away with the cover removed;

Fig. 14 is a side elevational view partially in section showing the motor end of the slide changing mechanism;

Fig. 15 is an enlarged detailed sectional view of the engaging means;

Fig. 17 is a detailed view in perspective of the cooperating portions of the engagement lever and the indexing pawl lever;

Figs. 18–20 are fragmentary plan views showing three positions of the index pawl lever and the engagement lever during the slide changing cycle;

Figs. 21 and 22 are fragmentary perspective views of the engaging means in engaged and disengaged positions, respectviely;

Figs. 23–26 are fragmentary perspective views of the timing means showing four positions of the time controlling ratchet disk;

Figs. 27 and 28 are detailed plan views of the timing means showing the operation of the neutralizing cam;

Fig. 29 is a perspective view partially cut away of the cover showing the adjustable support;

Fig. 30 is an enlarged detailed view partially in section of the adjustable support;

Fig. 31 is a sectional view taken along the line 31—31 of Fig. 30;

Fig. 32 is a sectional view corresponding to Fig. 31 showing the pawl member in its disengaged position;

Fig. 33 is an exploded perspective view of the support;

Fig. 34 is an enlarged sectional view of the air operated remote control means; and Fig. 35 is an enlarged sectional view of the electrically operated remote control means.

Figure 5:
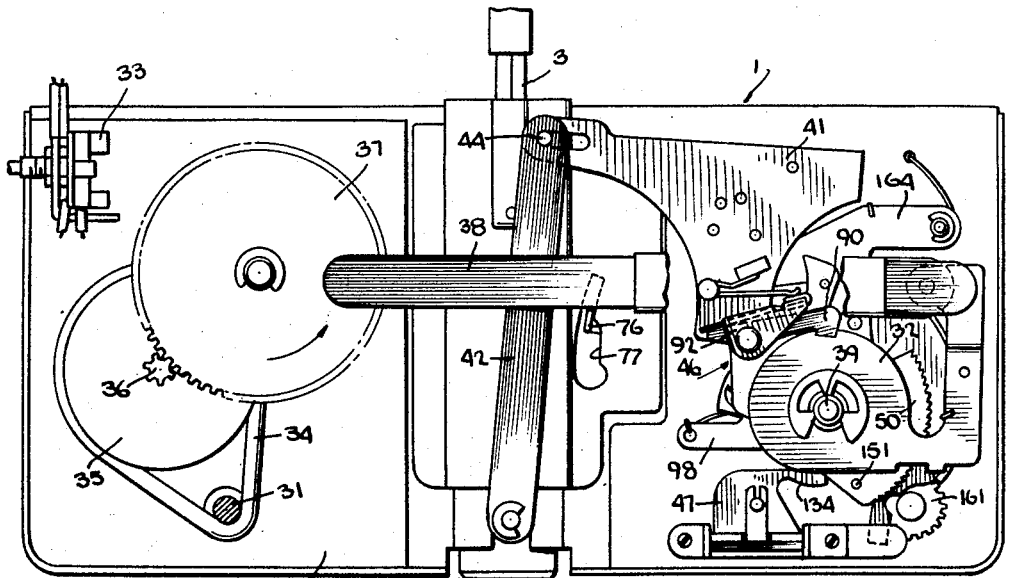

Referring to the drawings and more particularly to Figs. 1 and 4, the slide actuating mechanism will be described in connection with a slide changer 1 which has a magazine 2 slidably fitted thereon, a housing 3 projecting from one side, and a reciprocable slide transferring means 4 projecting from its opposite side. The magazine 2 has a casing 5 which is divided into a plurality of transverse slide compartments 6, each of which contains a slide holder 7. The slide changer 1 is provided with a magazine support plate 8 having a magazine rail 8a at one side and magazine guide 9 at its opposite side which cooperate to hold the magazine 2 in position on the support plate 8. Slide holders 7 from the magazine 2 are moved through the open side of magazine 2 and slot 10 in the magazine rail 8a into the housing 3 by the reciprocable slide transfer means 4. A suitably positioned aperture 11 in the housing 3 exposes the transparent picture mounted in the slide holder 7 to the projecting lens system of a suitable slide projector (not shown).

The reciprocable slide transfer means 4, as best seen in Figs. 1 and 14, comprises an injection lever 12 mounted by means of handle 14 on lever 15. Lever 15 is slidably mounted in sliding sleeve 16 which is slidably mounted in channel 16a on the magazine support plate 8. The inner end of the injection lever 12 is slidably mounted in a guide means 17 formed in the magazine guide 9. This slidable mounting means for the inner end of injection lever 12 comprises a stationary stud 18 mounted on the guide means 17 and adapted to engage a cam slot 19 in the injection lever 12. When the injection lever 12 is moved inwardly, downwardly directed portion 20 of cam slot 19 lowers the hook 21 of the injection lever 12 into a cooperating slot 22 on a slide holder 7 causing the slide holder 7 to be moved through slot 10 into the viewing aperture 11 of the housing 3. Outward motion of the injection lever 12 returns slide holder 7 to the magazine 2 and disengages the hook 21 from the slot 22 in the slide holder 7.

A suitable indexing means is provided to cooperate with the slide transfer means 4 to advance the magazine 2 so that each time that the injection lever 12 is withdrawn from the magazine the succeeding slide holder 7 in the magazine is moved into position adjacent to the hook 21 of the injection lever 12. The magazine indexing mechanism may be any suitable type, such as that shown in my above-described patent; however, a preferred magazine advancing means is disclosed herein and will be more particularly described below.

The automatic actuating means of the present invention automatically and periodically moves the injection lever 12 into and out of the magazine 2 to move the slide holders 7 successively into the viewing aperture 11 of the housing 3 as the magazine 2 is advanced on the magazine support plate 8.

Referring to Figs. 4 and 13, the automatic actuating means includes a drive motor or drive means 30 mounted at one end of the slide changer 1 and operatively connected to an operating disk 32 on the opposite end of the slide changer 1 through the intermediation of a coupling means comprising drive pulley 31, drive belt 34, pulley 35, pinion 36, main gear 37, and a connector rod 38. The operating disk 32 is rotatably mounted upon a cam shaft 39 and the connector rod 38 is pivotally connected to the operating disk 32 by means of a pin 40 so that the rotary motion of the main gear 37 is transformed by means of connecting rod 38 to a rocking or oscillating motion of the operating disk 32 about the cam shaft 39. Also rotatably mounted on the cam shaft 39 is an engagement lever 41 which is operatively connected to the injection lever 12 through a coupling means comprising slide link 42 which is pivotally connected at its opposite ends 44 and 45 to the engagement lever 41 and the sliding lever 15, respectively. A rocking or oscillating motion of the engagement lever 41 about the cam shaft 39 causes a reciprocating motion of the injection lever 12 into and out of the magazine 2 to transfer the slide holders 7 successively into the viewing aperture 11 of the housing 3. In order to connect engagement lever 41 and the operating disk 32, an engaging means indicated generally at 46 is provided. While the engagement lever 41 and the operating disk 32 are connected by engaging means 46, each rotation of the main gear 37 by the drive motor 30 causes a single reciprocation of the injection lever 12 into and out of the magazine 2 to move one slide to and from the slide viewing position in the housing 3.

In order to control the length of time during which each slide holder 7 is in the viewing position, engaging means 46 is designed to disconnect the continually oscillating operating disk 32 from the engagement lever 41 for predetermined or controllable periods after the injection lever 12 has moved a slide holder 7 into the viewing aperture 11. The operation of the engaging means 46 to provide for this disconnection is accomplished by means of a release lock 47 under the optional control of an automatic timer or a manually operated control means, as will be more fully described below.

*Magazine indexing means*

The magazine indexing means may be operated by the slide transferring means, such as, for example, by the means shown in my above-described patent. A preferred form of a magazine indexing means is illustrated in the drawings which is operated through the intermediation of the engagement lever 41 of the automatic actuating means.

As seen in Figs. 2 and 3, each of the magazines 2 has a rack 50 on its bottom side which is adapted to be engaged by a gear 51 rotatably mounted upon the magazine support plate 8 so that the teeth of the gear 51 mesh with the rack 50 when the magazine 2 is moved into position between the magazine rail 8a and the magazine guide 9. For each cycle of the injection lever 12 moving a slide into and out of the viewing position, the gear 51 control means indicated generally at 52 turns the gear 51 an amount equivalent to the width of one tooth and the magazine 1 is advanced a distance corresponding to the width of one slide compartment 6. Each time that the injection lever 12 reaches its fully extended position outside of the magazine 2, the magazine 2 is moved forward to present the next slide holder 7 to the hook 21 of the injection lever 12.

This action of the gear control means 52 is illustrated in Figs. 2 and 3. A pawl 54 is pivotally mounted at 55 on a pawl lever 56. Pawl lever 56 is pivotally mounted at 57 on the magazine support plate 8 so that when the pawl lever 56 swings from its neutral position as shown in Fig. 2 to its engagement position as shown in Fig. 3, the pawl 54 engages one of the teeth 58 of the gear 51 and rotates it in a counterclockwise manner, causing the rack 50 and therefore the magazine 2 to be moved forward to present the next slide holder 7 to the injection lever 12. A pawl spring 59 mounted on the pawl lever 56 resiliently urges the pawl 54 against the teeth 58 of the gear 51 on the clockwise motion of pawl lever 56 and permits the pawl 54 to ride over the teeth 58 of gear 51 without rotating gear 51 on the return counterclockwise motion of pawl lever 56. At the end of the clockwise motion of pawl lever 56 (Fig. 3), a cam roller 54a on pawl 54 engages a cam surface 54b on aperture 54c in the magazine support plate 8 to move the pawl 54 clear of gear 51 so that pawl 54 does not interfere with manual indexing of the magazine 2 in either direction.

Ratchet lever 60 is pivotally mounted on the magazine support plate 8 and it has a V-shaped cam surface 62 adjacent its free end 64. This cam surface 62 engages a roller 65 on the pawl lever 56 so that the spring force of ratchet lever spring 66 urges the pawl against the gear teeth 58 during the final portion of the clockwise rotation of the pawl lever 56 and holds pawl lever 56 firmly in its neutral position (Fig. 2) when it has been returned thereto by the counterclockwise motion of the pawl lever 56.

A locking pawl 70 pivotally mounted at 71 on the magazine support plate 8 has a locking tooth 72 at its free end which indexes the gear 51 by engaging two adjacent teeth 58 on the gear 51. Locking pawl 70 is held tightly in position by a pawl spring 74 and by a cam surface 75 on the ratchet lever 60 which engages the locking pawl 70 when the ratchet lever 60 has moved the pawl lever 56 to its extreme clockwise position (Fig. 3) after the rotation of the gear 51 by the pawl 54.

The movement of the pawl lever 56 from its neutral position as shown in Fig. 2 to its gear turning position as shown in Fig. 3 is initiated by the engagement of a leg 76 on pawl lever 56 with pawl lever cam arm 79 formed on an edge of engagement lever 41. Leg 76 extends to the underside of the magazine mounting plate 8 through an aperture 77. A pawl lever follower 78 pivotally mounted on the engagement lever 41 returns the pawl lever 56 to its neutral position as seen in Fig. 2. The action of the pawl lever follower 78 and the cam surface 79 during a cycle of the engagement lever 41 and its interconnected slide link 42 and injection lever 12 is shown in Figs. 17 through 20.

Fig. 17 shows the engagement lever 41 in its extreme counterclockwise position corresponding to the position of the injection lever 12 shown in Figs. 1 and 3 where injection lever 12 is withdrawn completely from the magazine 2. In this position, as seen in Fig. 3, pawl 54 has completed an indexing movement of the gear 51. The new cycle is started by the movement of the injection lever 12 into the magazine 2 by clockwise rotation (Fig. 4) of the engagement lever 41. As seen in Fig. 17, the flat end portion 81 of the pawl lever follower 78 engages the leg 76 of the pawl lever 56. Continued clockwise rotation of the engagement lever 41, as seen in Fig. 18, rotates the pawl lever 56 towards its neutral position as seen in Fig. 2. When the pawl lever 56 has been moved a substantial portion of its distance towards its neutral position to the position shown in Fig. 19, the cam surface 62 of the ratchet lever 61 completes the return of pawl lever 56 to its neutral position, thereby swinging it clear of the end portion 81 of the pawl lever follower 78. The pawl lever 56 remains in its neutral position during the time the engagement lever 41 moves the injection lever 12 fully into the magazine 2, thereby positioning the slide holder 7 in the viewing aperture 11 and thereafter until the slide holder 7 is returned to the magazine 2. The cam surface 79 on the engagement lever 41 is positioned to strike leg 76 of the pawl lever 56 at the point where the injection lever 12 is completely withdrawn from the magazine 2 (Fig. 20). Additional rotation of the engagement lever 41 in a counterclockwise direction (Fig. 4) causes the cam surface 79 to swing the pawl lever 56 to the position shown in Fig. 3, thereby driving the pawl 54 against a tooth 58 of gear 51 and moving the magazine 2 ahead to present the next slide holder 7 to the injection lever 12.

*The engagement means*

As described above, the operating disk 32 is continuously rocked or oscillated on the cam shaft 39 when the switch 33 is closed to energize drive motor 30. The engagement means 46 provides a detachable connection between the oscillating operating disk 32 and the engagement lever 41 which reciprocates the slide frame injection lever 12 through the intermediation of the slide link 42.

The engagement means 46, illustrated in Figs. 21 and 22, comprises an engagement hook 90 pivotally attached at 93 to the engagement lever 41 and positioned to engage a hook engaging means or slot 91 on the operating disk 32 under the control of an engagement cam follower 92 which is pivotally mounted on engagement lever 41 on the same pivot 93 as engagement hook 90. The engagement cam follower 92 is controlled by a downwardly extending contact 94 which rides on a cam surface 95 on engagement cam 96. The engagement cam 96 is mounted by means of a slot 97 on the cam shaft 39, and it is adapted to be rotated between two positions on the cam shaft 39 by an engagement cam release 98 which is also mounted on cam shaft 39. In the first or engaged position of engagement cam 96, as seen in Fig. 21, the cam surface 95 and contacting foot 94 have been moved inwardly toward cam shaft 39 by spring 99 so that engagement hook 90 engages slot 91 in operating disk 32. In its second or disengaged position, as seen in Fig. 22, the cam surface 95 is moved outwardly from cam shaft 39 so that the engagement cam follower 92 is swung outwardly, allowing spring 100 to move engagement hook 90 from slot 91.

When the engagement cam is in its engaged position, as seen in Fig. 21, with the engagement hook 90 seated in slot 91, the operating disk 32 and the engagement lever 41 move in synchronism and the slide transfer means moves through a slide changing cycle, thereby moving one slide holder 7 out of the viewing position and another one into the viewing position for each rotation of the main gear 37. When the engagement cam is in its disengaged position, as seen in Fig. 22, the slide transfer means remains stationary with a slide holder 7 in the viewing position adjacent aperture 11.

The engagement cam 96 is moved between its engaged and its disengaged positions by the engagement cam release 98, which is controlled by means of an automatic timing means indicated generally at 102, or at the option of the operator by manually operated operating lock 47.

The engagement cam release 98 is rotatably mounted on the cam shaft 39 immediately adjacent to the engagement cam 96 with a cam roller 105 on the engagement cam release 98 engaging a cam slot 106 in the engagement cam 96. The engagement cam release 98 and the engagement cam 96 as well as the other rotatable members on cam shaft 39 are separated by neutralizing washers 39a. With the hooked end portion 107 of the engagement cam 95 preventing rotational movement of the engagement cam 96 about cam shaft 39 by its engaging contact 94, the counterclockwise rotation of the arm 108 of engagement cam release 98 from the engaged position as seen in Fig. 21 to the disengaged position as seen in Fig. 22 moves roller 105 from the radially outward end 109 of slot 106 to the radially inward end 110, causing the engagement cam 95 to move in slot 97 on cam shaft 39 so that cam surface 95 of the engagement cam 96 moves outwardly from cam shaft 39, thereby lifting the engagement cam follower 92 and removing the engagement hook 90 from slot 91.

The engagement cam release 98 is urged towards its engaged position, as seen in Figs. 5 and 21, by a spring 112 connected to the outer end of arm 108 on the engagement cam release 98. When the engagement cam release 98 is in this position, the engagement hook engages slot 91, causing the engagement lever 41 to rotate with the operating disk 32. As the engagement lever 41 moves in a counterclockwise direction, as seen in Fig. 11, the contact or arm 94 on the engagement cam follower 92 strikes the arm 108 of the engagement cam release 98 and moves the engagement cam release 98 to its disengaged position, as seen in Fig. 22. When the engagement cam release 95 reaches this position, the release lock 47 engages the extension 113 on the engagement cam release 98 and holds it in its disengaged position. As the engagement lever 41 continues on its cycle and is carried in a clockwise direction by the operating disk 32 back to the starting position, as seen in Fig. 5, the engagement cam 96 lifts the engagement cam follower 92, releasing the engagement hook 90 from the slot 91. The operating disk 32 will now oscillate independently of the engagement lever 41 so that the slide holder 7 which has been moved into the viewing aperture 11 by the clockwise motion of the engagement lever 41 will remain in its exposed position until the release lock 47 is operated, as will be explained below, to free the engagement cam release 98 to initiate another cycle.

The release lock 47 has an L shaped cross section (Figs. 21 and 34) and it is pivotally mounted at the end of one of its legs 119 by pinions 120 which are swingably mounted in release lock bracket 121. A release lock button 122 controls the position of the release lock 47 through the intermediation of release lock shaft 124. The end 130 of release lock shaft 124 engages arm 125 on the release lock 47 and passes through suitable apertures 126 and 127 in the release lock 47 and the magazine mounting plate 8, respectively. The release lock shaft 124 mounts release lock button 122 on its upper end 128 and has compressed spring 129 positioned between the magazine mounting plate 8 and the release lock button 122 which urges the attached end 130 of the release lock shaft 124 towards the magazine mounting plate 8, causing the leg 131 of the release lock 47 to be resiliently urged towards the magazine mounting plate 8. When the engagement cam release 98 is rotated to its disengaged position as shown in Fig. 22, the spring 129 causes the leg 131 of the release lock 47 to swing inwardly and to engage the extension 113 of the engagement cam release 98, thereby locking it in its disengaged position. When the release lock button 122 is pressed towards the magazine mounting plate 8, release lock 47 pivots away from the undersurface of the magazine mounting plate 8, thereby moving the leg 131 clear of the engagement cam release 98 so that it snaps to its engaged position under the force of the spring 112. A cam surface 134 is provided on the leg 131 of the release lock 47 which is adapted to be engaged by the timing mechanism. As will be more fully explained below, the timing mechanism engages surface 134 to rotate the release lock 47 clear of the engagement cam release 98 in the same manner as the release lock button 122.

An air operated remote control means to release lock 47 and to initiate a slide changing cycle is shown in Fig. 34. A threaded connection 170 is provided on the cover 171 to which the remote control means 172 is attached. Remote control means 172 comprises a pin 174 slidably mounted in a bearing 175 and having its inner end adjacent to leg 119 of lock 47 and its outer end adjacent to flexible diaphragm 176. A flexible tube 177 connects a sealed chamber 178 on the outer surface 179 of diaphragm 176 to a squeeze bulb 180. When bulb 180 is squeezed, it compresses the air in chamber 178, thereby moving diaphragm 176 and pin 174 inwardly. Pin 174 swings lock 47 on pinions 120, thereby releasing engagement cam release 98.

An electrically operated remote control 181 is shown in Fig. 35 threadedly connected to cover 171 at 170 in place of the air operated means 172 of Fig. 34. Control 181 comprises an electric solenoid 182 mounted in a case 184 and having a slidable armature 185 therein with its inner end 186 positioned adjacent to arm 119 of lock 47. When switch 187 is closed, current flows through solenoid 182 from a source connected by plug 188. The end 196 of armature 185 is moved against lock 47 against the force of spring 189 to swing lock 47 clear of the engagement cam release 98.

*Timer mechanism*

Figure 7:
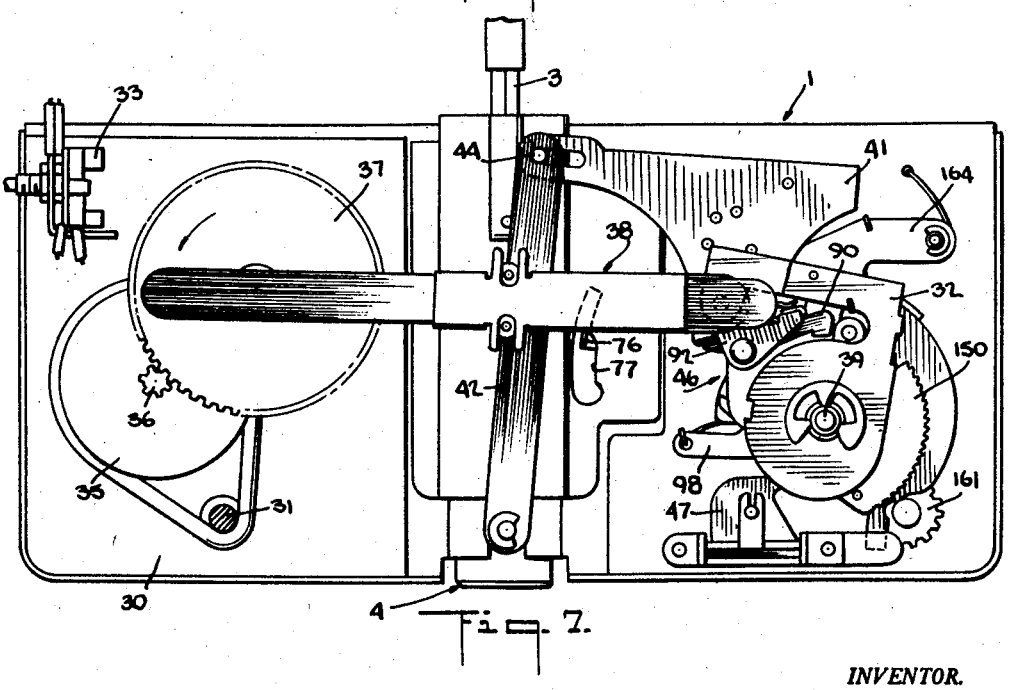
Figure 16:
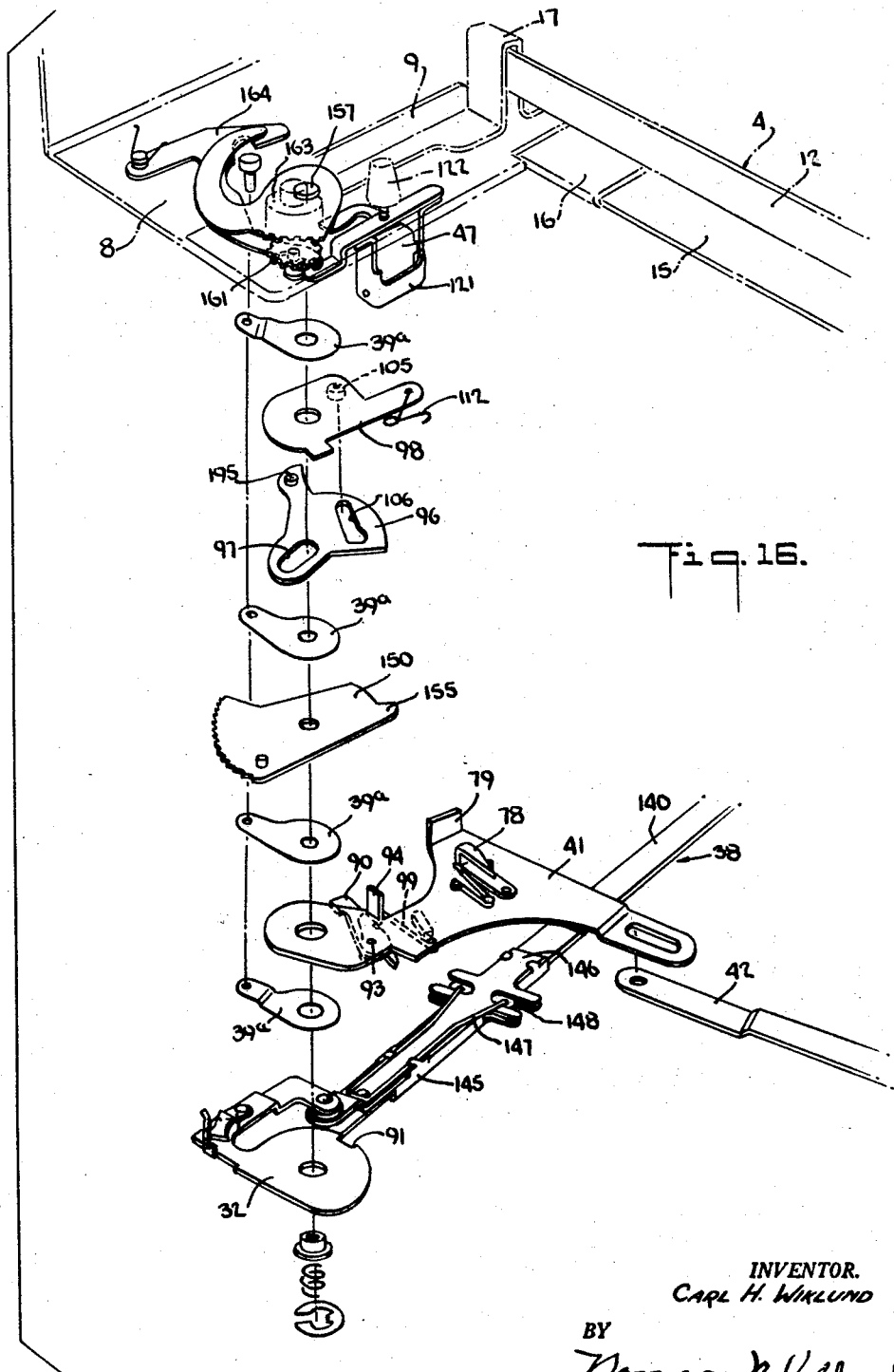
Fig. 16 is an exploded view in perspective of the engaging means and the related connecting means.

The timer mechanism 102 is provided on the cam shaft 39 to automatically operate the release lock 47 at predeterminable and adjustable intervals so that the slide actuating mechanism will move successive slide holders 7 to the viewing position automatically at predetermined intervals. The timer mechanism (Figs. 23–26) comprises a ratchet disk 150 rotatably mounted on the cam shaft 39 concentrically with operating disk 32. The ratchet disk 150 has a cam pin 151 mounted adjacent its outer edge which is adapted to engage the cam surface 134 of the release lock 47 when the ratchet disk 150 is rotated clockwise by a pawl 156 on operating disk 32 from its starting position as seen in Fig. 23 to the position shown in Figs. 24 and 25. As is best seen in Fig. 24, the cam pin 151 in this position engages the cam surface 134 of the release lock 47, thereby rocking the leg 131 of the release lock 47 outwardly from the magazine mounting plate 8 so that the engagement cam release 98 springs to its engaged position. When the engagement cam release 98 is moved to its engaged position, engagement lever 41 is connected to operating disk 32 so that it rotates in synchronism with the operating disk 32 first counterclockwise and then clockwise. During the counterclockwise portion (Figs. 25 and 26) of the rotation of the engagement lever 41, the engagement cam follower arm 94 contacts the end 155 of the ratchet disk 150 and rotates it in a counterclockwise direction. This moves the cam pin 151 clear of the release lock 47 and returns the ratchet disk 150 to its starting position as seen in Fig. 26. The release lock 47 re-engages the engagement cam release 98 so that when the engagement lever 41 returns to slide viewing position as seen in Fig. 7, the engagement hook 90 will be released from slot 91 as described above, disconnecting the engagement lever 41 from the operating disk 32. As the main gear 37 is continuing to rotate, the operating disk 32 continues to oscillate or rock about the cam shaft 39. This rocking motion of the operating disk 32 is transferred to the ratchet disk 150 by an operating pawl 156 which is pivotally mounted at the edge of the operating disk 32, as seen in Figs. 16 and 23.

In order to adjustably determine the portion of the oscillation of the operating disk 32 during which the operating pawl 156 engages the teeth of the ratchet disk 150 and therefore the number of oscillations required to move the cam pin 151 against lock 47, a timing cam 157 is provided in the path of the operating pawl 156. As seen in Fig. 27, the cam 157 is rotatably mounted on cam shaft 39 and it has a generally arcuate cam surface 158 which is engaged by a cam follower 159 on the pawl 156. While the cam follower 159 is in engagement with the cam surface 158, the pawl 156 is lifted out of engagement with ratchet disk 150. By rotating the cam 157 on cam shaft 39, the portion of the cam surface 158 which engages the cam follower 159 on ratchet 156 may be varied and thus the portion of the oscillation of operating disk 32 during which the ratchet 156 engages ratchet disk 150. The position of the cam 157 is controlled by the cooperating rack portion 160 on cam 157 and pinion gear 161. Pinion gear 161 is mounted on rotatable shaft 162 which has a control knob 163 mounted thereon (Fig. 13) above magazine mounting plate 8. When the cam 157 is rotated to its extreme clockwise (Fig. 27) position, the pawl 156 contacts the ratchet disk for only a small portion of its oscillating motion about cam shaft 39, thereby requiring a relatively large number of oscillations to move the cam pin 151 against lock 47 to initiate a slide changing action. When the cam is moved to its extreme counterclockwise position, the pawl 156 is in contact with the ratchet disk over a major portion of its travel, thereby moving the cam pin 151 against lock 47 in a relatively few oscillations and a correspondingly short time. The cam 157 may be set at any position between its extreme positions by control knob 163 to provide the slide viewing interval desired. A suitably calibrated plate is provided adjacent knob 163 to provide an indication of the intervals.

A neutralizing cam 164 is pivotally mounted at 165 on magazine support plate 8 adjacent to timing cam 157 (Figs. 27 and 28). Neutralizing cam 164 has an arcuate cam surface 166 which engages the cam follower 159 of the timer pawl 156 when the neutralizing cam is in its operative position as seen in Fig. 28. In this position, the pawl 156 is held out of engagement with the ratchet disk 150 so that the automatic slide changing action is inoperative. When the neutralizing cam is in its inoperative position as seen in Fig. 27, its cam surface 166 is spaced from the pawl 156 and it has no effect thereon.

The position of the neutralizing cam is controlled by a hold button 167 mounted in the hollow center of the timer control knob 163 (Fig. 13). Hold button 167 has a downwardly extending rod 168 slidably mounted in the hollow center of control knob shaft 162. The rod 168 has a flange 169 on its lower end which engages the end 190 of the neutralizing cam 164 and holds it in its inoperative position as seen in Fig. 27. When the hold button 167 is pushed downwardly against its biasing spring 191 (Fig. 13), the flange 169 on rod 168 moves beyond the neutralizing cam, allowing the neutralizing cam to move against the rod 168 under the force of spring 194 with slot 192 engaging the rod 168. In this position, the neutralizing cam moves to its operative position (Fig. 28) engaging the cam 159 of pawl 156 and holding the pawl 156 away from the ratchet disk 150 so that the slide changing operation is suspended.

In order to resume the automatic changing cycle, the release lock button 122 is pressed, thereby starting a new cycle as described above. During the cycle, the arm 94 of the engagement cam follower 92 swings the engagement cam release 98 and the associated engagement cam 96 to their extreme counterclockwise position as seen in Fig. 26. At this point cam roller 195 on the engagement cam 96 rotates the neutralizing cam in a clockwise direction about its pivot 165, thereby moving its end 190 free of the control knob rod 168 so that the control knob returns to its normal position as seen in Fig. 27 with the neutralizing cam in its inoperative position.

Slide magazines 2 may be loaded onto the magazine support plate 8 while the slide injection lever 12 is either in its withdrawn or inserted positions with respect to the housing 3. When the slide injection lever 12 is withdrawn, the magazine 2 is positioned with the first slide holder 7 adjacent the slide injection lever 12 so that the next changing cycle moves the first slide holder 7 into the viewing position. When the slide injection lever 12 is in its inserted position in the housing 3, the end 5a of the magazine casing 5 is moved against the side of the injection lever 12. In this position, the first tooth on the magazine rack 50 will be engaged by the stepping gear 51. When switch 33 is closed to start the changing cycle, the injection lever 12 will strike the end 5a of the magazine casing 5 on the first cycle. In order to allow the injection lever 12 to strike the end 5a of the magazine casing 5 without damaging the mechanism and without interrupting the slide changing cycle, an automatically disengageable clutch means is provided in the connecting rod 38. This clutch means is illustrated in Figs. 4 and 16. The connector rod 38 comprises an elongated clutch slide 140 which is pivotally connected at 141 to the main gear 37 and which has its other end 142 slidably mounted in a clutch sleeve 144 comprising clutch base 145 and a clutch cover 146. In order to prevent relative motion between the clutch slide 140 and the clutch sleeve 144 during normal operation of the mechanism, generally U-shaped clutch spring 147 is attached to the clutch spring base 145 having a pair of rollers 148 rotatably mounted on its free ends. Cooperating notches 149 are formed in the clutch slide 140 which receive the rollers 148 so that the tension of the spring 147 holds the clutch sleeve 144 and the clutch slide 140 in a fixed relationship for normal operating forces. When the slide injection lever 12 strikes the front end 5a or rear end 5b of a slide magazine 2 or should any of the mechanism connected to the clutch sleeve become otherwise jammed, continued rotation of the main gear 37 forces the clutch slide 140 against the rollers 148 with sufficient force to cause them to spread outwardly away from each other and to roll out of the notches 149 in the clutch slide 140, thereby allowing the clutch slide 140 to slide freely in the clutch sleeve 144 as the rollers 148 roll along opposite edges of the clutch slide 140. When the slide injection lever 12 is released for normal movement into the magazine 2, such as on its second cycle after the magazine loading, the rollers 148 automatically drop back into notches 149.

In order to partially support the weight of the slide changer 1 when it is mounted on a slide viewing or projection device, an adjustable support 200 is mounted on the cover 171 as seen in Figs. 29–33. The support 200 comprises upper and lower hollow telescoping cylindrical sections 201 and 202, respectively. The upper section 201 has its upper end 203 fastened to the magazine mounting plate 8 by tabs 205 and has its lower end 204 positioned by aperture 206 in the cover 171. An elongated slot 207 is provided in the upper section 201 which has ratchet teeth 208 on one edge. The ratchet teeth 208 are engaged by a spring-like resilient generally U-shaped pawl member 209 which has a pawl tooth 210 and which fits into the lower support section 202. An aperture 211 in the lower section accommodates the ends 212 of the pawl member 209 and holds the pawl member 209 in position on lower section 202. The resilient pawl member 209 urges pawl tooth 210 against ratchet teeth 208, allowing downward motion only of lower section 202 when the support sections are in their normal position as seen in Figs. 30 and 31. When it is desired to raise the lower section 202, the lower section is rotated counterclockwise with respect to upper section 201 as seen in Fig. 32, thereby lifting the pawl tooth 210 from the ratchet teeth 208. An adjustable foot 214 is threadedly mounted at 215 on lower section 202 and a suitable resilient tip 216 is provided on foot 214.

*Operation*

The operation of the slide changing mechanism which has been described in detail above will now be summarized by a description of a slide changing cycle of the mechanism.

When a magazine 2 containing the slide holders 7 is mounted on the magazine support plate 8, the rack 50 on the bottom of the magazine 2 engages the magazine indexing gear 51. As described more fully above, the rack 50 of the magazine 2 may be engaged with gear 51 with the slide injection lever 12 in either its inserted or withdrawn positions with respect to the housing 3.

The slide changing action may then be initiated by closing the motor switch 33. The fully automatic features of the invention will then be in effect and the operator need only to choose the desired slide interval setting. If at any time during the automatic operation, the operator wishes either to return to a preceding slide or advance to a later slide in the magazine, the motor switch 33 is opened, the injection lever 12 of the slide transferring means 4 is moved to its extreme outer position as seen in Fig. 3, the operator may then re-position the magazine forward or backwards as desired before returning the invention to automatic operation. The injection lever 12 may be moved to this outward position from any portion of the slide transferring cycle as the withdrawal of the injection lever 12 will either rotate the mechanism to the proper position or it will disengage the clutch means in the connecting rod 38 to facilitate its withdrawal should any resistance be provided due to the particular position of the main gear 37 in the cycle.

Once the magazine 2 has been placed in position and the slide changing action initiated by the closing of the motor switch 33, the operating disk 32 will now be oscillated or rocked on the cam shaft 39 by motor 30 through the connecting means which includes the connecting rod 38. The timer control knob 163 is adjusted so that the operating pawl 156 engages a predetermined number of teeth on the ratchet disk 150 for each oscillation of the operating disk 32. A given number of oscillations of the operating disk 32 moves the cam pin 151 on the ratchet disk 150 against the lock 47 (Figs. 8–10). Lock 47 is lifted clear of the engagement cam release 98 so that it shifts the engagement cam to its engaged position as seen in Fig. 21. As described more fully above, the hook means 90 now connects the engagement lever 41 with the oscillating operating disk 32 so that the injection lever 12, which is operatively connected to the engagement lever 41, is moved into the magazine 2 so that a slide holder 7 is moved to the viewing position adjacent aperture 11. When the engagement lever 41 reaches this position, its associated contact 94 has rotated the engagement cam release 98 and the engagement cam 96 (Fig. 4) to their disengaged position as seen in Fig. 22. Ratchet disk 150 is also returned to its starting position as seen in Fig. 4. At this point, the hook 90 is disengaged (Fig. 6) from the operating disk 32 so that the engagement lever 41 is now disconnected and remains stationary on cam shaft 39 with a slide holder 7 in the viewing position and lock 47, which has re-engaged the engagement cam release 98, will now hold the engagement cam release 98 stationary until the cam pin 151 of the ratchet disk 150 is again moved against lock 47 by a predetermined number of oscillations of the operating disk 32 on the cam shaft 39. When the predetermined number of oscillations of operating disk 32 has occurred, the engagement cam release 98 will again be released from the lock 47 and the engagement lever 41 will be moved through one cycle, causing the injection lever 12 to be withdrawn from the magazine, the magazine to be advanced by the magazine indexing mechanism whose operation has been fully described above, and the injection lever 12 to be reinserted in the magazine to move the next successive slide holder 7 into the viewing position.

As more fully described above, release lock button 122 may be pressed to release the lock 47 when it is desired to initiate a slide changing cycle without waiting for the action of the timer. Thus, when the release lock button 122 is held down continuously, a slide will be changed for each oscillation of the operating disk 32. When it is desired to extend the viewing time beyond the interval provided by the timing mechanism, the hold button 167 is pressed so that the neutralizing cam 164 removes the pawl 156 from the ratchet disk 150 so that the slide changing mechanism is temporarily disconnected until the release lock button 122 is again pressed to restore the slide changing mechanism to its normal operation.

When the last slide holder 7 in each magazine has been returned to the magazine from the viewing position, two more cycles of the slide changer will eject the magazine from the transferring means 4. Successive magazines 2 may be loaded into the changer without stopping the slide changing mechanism as the indexing gear 51 will engage the rack 50 of succeeding magazines if their forward end 5a is held against the rear end 5b of the preceding magazine by the operator. The clutch means on the connecting rod 38 prevents jamming as the ends 5a or 5b of the magazines 2 pass the slide injection lever 12.

It will be seen that the present invention provides a compact, efficient, and rugged slide changing mechanism adapted to provide for automatic, semiautomatic, or manually controlled slide changing at the option of the operator. A slide changing mechanism is provided in which the viewing interval for a plurality of magazine stored slides may be adjusted within a wide range. The slide viewing interval may be also lengthened indefinitely or shortened as desired by the operator through the operation of convenient controls. The slide changing mechanism is adapted for a compact construction and is thus readily applicable to presently marketed types of manual magazine slide changers.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. An automatic slide viewing device having a reciprocable means for successively moving slides horizontally toward and away from a viewing position, the combination of a drive means, a first coupling means operatively connected to said drive means including a disk rotatably mounted on a shaft and coupled to said drive means by an elongated relatively horizontal connecting rod, a second coupling means operatively connected to said reciprocable means including an engagement lever rotatably mounted on said shaft, an engaging means mounted on said shaft and removably connecting said first and second coupling means whereby said drive means is removably connected to said reciprocable means, and adjustable timing means mounted on said shaft and operatively connected to said engaging means to connect and disconnect the first and second said coupling means at adjustable intervals of time.

2. The device as claimed in claim 1 which further comprises a switch means operatively connected to said engaging means to connect and disconnect the first and second said coupling means independently of said timing means.

3. The device as claimed in claim 1 in which said timing means comprises a ratchet disk mounted on said shaft which is operatively connected to said first coupling means and is driven thereby.

4. In a slide viewing device having a reciprocable means for successively moving slides horizontally from a storage magazine toward and away from a laterally spaced viewing position, the combination of a drive means, a first coupling means operatively connected to said drive means and including a disk rotatably mounted on a vertical shaft, a second coupling means operatively connected to said reciprocable means including an engagement lever rotatably mounted on said vertical shaft, an engaging means rotatably mounted on said vertical shaft and removably connecting said disk and said engagement lever of said first and second coupling means whereby said drive means is removably connected to said reciprocable means, and magazine advancing means operatively connected to the second said coupling means.

5. The device as claimed in claim 4 which further comprises an overload clutch in said first coupling means adapted to immobilize said second coupling means and said reciprocable means and said magazine advancing means.

6. In a slide viewing device having a reciprocable member for moving a slide into and out of a viewing position from a slide magazine, the combination of a drive means, a first coupling means operatively connected to said drive means and including a disk rotatably mounted on a vertical shaft, a second coupling means operatively connected to said reciprocable member including an engagement lever rotatably mounted on said vertical shaft, an engaging means removably connecting said disk and said engagement lever of said first and second coupling means whereby said drive means is removably connected to said reciprocable member, magazine advancing means operatively connected to said second coupling means, and an adjustable timing means mounted on said vertical shaft and operatively connected to said engaging means to connect and disconnect the first and second said coupling means at adjustable intervals.

7. A slide changing device comprising the combination of a reciprocably mounted member adapted to engage a slide and to move it into and out of a viewing position from a magazine, a drive motor, a first coupling means operatively connected to said drive motor and including a disk rotatably mounted on a shaft, a second coupling means operatively connected to said reciprocable member including an engagement lever rotatably mounted on said vertical shaft, an engaging means rotatably mounted on said vertical shaft removably connecting said disk and said engagement lever of said first and second coupling means whereby said drive motor is removably connected to said reciprocable member, magazine advancing means operatively connected to said second coupling means, and an adjustable timing means mounted on said vertical shaft and operatively connected to said engaging means to connect and disconnect the first and second said coupling means at adjustable intervals.

8. An automatic slide changer adapted for use with a slide projector comprising a magazine support means adapted to support a slide holding magazine in a generally horizontal position, a housing projecting laterally from one side of said support plate having an aperture therein adapted to expose a slide to the optical system of the slide projector, a slide transferring means mounted on said support plate comprising a slide injection lever mounted for generally horizontal and reciprocal motion laterally of said magazine support means and adapted to move a slide into and out of said housing from a magazine on said magazine support means, a magazine indexing means on said magazine support plate adapted to engage the slide holding magazine and to move it along said support means, a drive motor on said magazine support plate, a disengageable coupling means operatively connecting said drive motor and said slide injection lever and said indexing means, an adjustable mechanical timer in said detachable coupling means adapted to adjustably control the duration of the disengaged periods thereof, and said timer being driven by an operative connection with said drive motor.

9. The slide changer as claimed in claim 8 in which said indexing means is positioned to engage a magazine in advance of said slide injection lever and said coupling means includes an automatically engaging and disengaging clutch means whereby the magazines may be placed on said magazine support means and engaged with said indexing means independently of the position of the slide injection lever.

References Cited in the file of this patent

UNITED STATES PATENTS

| | | |
|---|---|---|
| 1,082,260 | Braun | Dec. 23, 1913 |
| 2,146,452 | Spindler | Feb. 7, 1939 |
| 2,286,322 | Warriner | June 16, 1942 |
| 2,380,632 | Cousino | July 31, 1945 |
| 2,401,506 | Pechkranz | June 4, 1946 |
| 2,436,112 | Machado | Feb. 17, 1948 |
| 2,476,216 | Polleau | July 12, 1949 |
| 2,537,429 | Seyler | Jan. 9, 1951 |
| 2,593,727 | Cadwell et al. | Apr. 22, 1952 |
| 2,632,362 | Smith | Mar. 24, 1953 |
| 2,732,758 | Waller | Jan. 31, 1956 |
| 2,748,653 | Pollan et al. | June 5, 1956 |
| 2,784,817 | Lessman | Mar. 12, 1957 |